United States Patent [19]

Nakajima et al.

[11] Patent Number: 5,781,179
[45] Date of Patent: Jul. 14, 1998

[54] MULTIMODAL INFORMATION INPUTTING METHOD AND APPARATUS FOR EMBODYING THE SAME

[75] Inventors: Hideharu Nakajima; Tsuneaki Kato, both of Kanagawaken, Japan

[73] Assignee: Nippon Telegraph and Telephone Corp., Tokyo, Japan

[21] Appl. No.: 711,694

[22] Filed: Sep. 5, 1996

[30] Foreign Application Priority Data

Sep. 8, 1995 [JP] Japan .................................. 7-231667

[51] Int. Cl.$^6$ ...................................................... G09G 5/08
[52] U.S. Cl. ............................................ 345/157; 704/251
[58] Field of Search ........................ 340/825.19; 345/145, 345/157, 163, 159, 158; 395/2.44, 2.55, 2.56, 2.57, 2.58, 2.59; 704/211, 246, 251, 253, 257

[56] References Cited

U.S. PATENT DOCUMENTS

| | | |
|---|---|---|
| 4,914,704 | 4/1990 | Cole et al. . |
| 5,287,119 | 2/1994 | Drumm ................................. 345/157 |
| 5,329,609 | 7/1994 | Sanada et al. ........................ 395/2.44 |
| 5,386,494 | 1/1995 | White . |
| 5,617,508 | 4/1997 | Reaves ................................. 395/2.57 |

FOREIGN PATENT DOCUMENTS

| | | |
|---|---|---|
| 93-108302 | 4/1993 | Japan . |
| 94-110486 | 4/1994 | Japan . |

OTHER PUBLICATIONS

Article entitled, *Multi-Modal Natural Dialogue*, written by Thorisson, et al., dated May 3–7, 1992, pp. 653 to 654.
Article entitled, *Drawing Pictures with Natural Language and Direct Manipulation*, written by Hiyoshi and Shimazu, pp. 722–726; undated.

Chapter 3 of article entitled, *User and Discourse Models for Multimodal Communication*, written by Wolfgang Wahlster, pp. 45–67; undated.

English Abstract of 7th Symposium on *Human Interface*, Oct. 23–25, 1991 Kyoto, Hand Reader by Image Sequence Processing, by Fukumoto, et al., pp. 427–432.

Chapter 11, *Integrating Simultaneous Input from Speech, Gaze, and Hand Gestures*, by Koons, et al., pp. 256–276; undated.

English Abstract of an article entitled, *An Interface Using Mouse Movement and Voiced Command*, by Nakajima, et al., pp. 15–20. Feb. 1996.

*Primary Examiner*—Regina Liang
*Attorney, Agent, or Firm*—Banner & Witcoff Ltd.

[57] ABSTRACT

A command for application program is generated based on both a movement of a cursor on a display unit depending upon operation of a pointing device and a voice produced in parallel to the operation when the pointing device is operated to select an object being displayed on the display unit connected to a computer. Particularly, if a moving speed of the cursor in a region of the object has a local minimum value which is less than a predetermined speed, the object is selected as a referent candidate for the voice containing a demonstrative word. If a plurality of referent candidates each having the local minimum value less than the predetermined speed are present for the voice containing the demonstrative word, such object is recognized as a referent for the voice that a time period during when the cursor moves in a region overlaps at maximum with a time period during when the voice is produced.

9 Claims, 11 Drawing Sheets

| LANGUAGE AS THE RESULT OF LANGUAGE RECOGNITION | NUMBER OF OBJECTS INDICATED BY THE LANGUAGE | STARTING TIME OF VOICED SOUND AREA | ENDING TIME OF VOICED SOUND AREA |
|---|---|---|---|
| THIS | 1 | 0 | 210 |

FIG.3

| REFERENT CANDIDATE | TIME THE CURSOR ENTERS INTO REFERENT CANDIDATE REGION | TIME THE CURSOR LEAVES FROM REFERENT CANDIDATE REGION |
|---|---|---|
| objA | 0 | 5 |

FIG.4

| LANGUAGE AS THE RESULT OF LANGUAGE RECOGNITION | NUMBER OF OBJECTS INDICATED BY THE LANGUAGE | STARTING TIME OF VOICED SOUND AREA | ENDING TIME OF VOICED SOUND AREA | REFERENT CANDIDATE | TIME THE CURSOR ENTERS INTO REFERENT CANDIDATE REGION | TIME THE CURSOR LEAVES FROM REFERENT CANDIDATE REGION |
|---|---|---|---|---|---|---|
| THIS | 1 | 0 | 210 | obj1 | 5 | 200 |

FIG.5

| DEMONSTRATIVE WORD | NUMBER OF OBJECTS INDICATED BY THE DEMONSTRATIVE WORD |
|---|---|
| THIS | 1 |
| IT | 1 |
| ⋮ | ⋮ |

FIG.6

| LANGUAGE | COMMAND FORMAT |
|---|---|
| MOVE HERE | MOVE([OBJECTS], EQUIVALENT TO "HERE") |
| DELETE | DELETE ([OBJECTS]) |
| ⋮ | ⋮ |

MULTIMODAL INFORMATION INPUTTING METHOD AND APPARATUS FOR EMBODYING THE SAME

BACKGROUND OF THE INVENTION

1. Field of the Invention

The present invention relates to a multimodal information inputting method and an apparatus for embodying the same and, more particularly, a multimodal information inputting method having a plurality of inputting means such as voice and gesture and an apparatus for embodying the same. Still more particularly, the present invention relates to a multimodal information inputting method, upon inputting information into a computer by means of both user's pointing gesture with the use of a pointing device such as mouse and user's voice, capable of effectively inputting information by correlating an object pointed out by such pointing gesture with the use of the pointing device with a demonstrative word included in such voice to translate the information into a command suitable for an application program, and an apparatus for embodying the same.

2. Description of the Prior Art

Conventionally, there are various operations such as documents and drawings formation, data input into the forms, question matter input into Help function, etc. to input information into a computer. In such information inputting operations, if information are input by both the voice and the mouse rather than by the voice or the mouse alone, efficiency in inputting information can be increased high because respective ambiguous portions can be compensated mutually by respective clear portions.

For instance, in case a question is input to inquire the function of an icon displayed on a computer display in which window display is enabled, inputting efficiency is enhanced if the user questioned "What is this?"

with pointing the icon by the mouse cursor instead of inputting the question like "What is the icon located at the upper right in the 'System Holder' holder".

This is because qualifiers concerning the location and the profile of the referent such as icon need not be sounded and the user himself or herself can point the referent without his or her strict recognition for the location of the referent as language.

In the conventional inputting device (M. Hiyoshi and H. Shimazu: "Drawing Picture with Natural Language and Direct Manipulation", Proceedings of COLING 94, vol.2, pp.722–726, 1994), mouse click is utilized as a means for effecting pointing gesture.

However, if the above prior art is applied to the application program by which buttons which can directly operated by clicking the mouse are displayed on the display, the operation assigned to the button starts when the button is clicked to point.

More particularly, it is impossible in the prior art to discriminate the mouse click which is intended as a pointing gesture used when information such as question accompanied by the language, e.g., demonstrative word or noun, to point the object are input (for instance, mouse click for pointing the object intended by the demonstrative word "this" while the user speaks "What is this?") from the mouse click which is intended as direct manipulation (for instance, mouse click for pushing a button on the display). For this reason, there is arisen a problem that ambiguity is created in the mouse operation.

The followings can be taken as a countermeasure against this problem, for example.

(1) Switching mode between the information inputting mode such as question and the direct manipulation mode by the mouse, (2) Using the right mouse button in the information inputting mode such as question, while using the left mouse button in the direct manipulation mode, and (3) Using special keys simultaneously with the click of the mouse button in either mode of the information inputting mode and the direct manipulation mode.

However, there is caused a problem that inputting efficiency is lowered since the user must effect consciously mode switching, use of different buttons, and simultaneous use of specific keys with the mouse every time.

In addition, as another literature concerning such multimodal information inputting method, there is a literature, Wahlster, W., "User and Discourse Models for Multimodal Communication", In Sullivan J. W. And Tyler S.

W.(ed). Intelligent User Interfaces, ACM Press, 1991, pp.45–67. As set forth in Section 3.5 and Section 3.9 in the text of this literature, pointing gesture has employed a tactile gesture scheme using a touch panel. Further, the referents are not buttons, etc. but certain type tax forms.

Moreover, there has been disclosed a literature, i.e., FUKUMOTO Masaaki, MASE Kenji, and SUENAGA Yasuhito, "Hand Reader by Image Sequence Processing", The 7-th Human Interface Symposium, 1991, pp.427–432. The referent set forth in this literature can be recognized in virtue of the calculation which is made based on a location (one point), where the speed of the pointing gesture to be carried out continuously is minimized locally, within the time period which corresponds to the voice interval during when the voice is produced in parallel to the pointing gesture. In addition, image data are acquired every constant sampling interval.

Further, there has also been disclosed a literature, i.e., Koons, D. B., Sparrell, C. J., Thorisson, K. R., "Integrating Simultaneous Input from Speech, Gaze, and Hand Gestures", In Maybury, M. T.(ed), Intelligent Multimedia Interfaces, AAAI Press/MIT Press, 1993, pp.257–276. In this literature, hand gestures are used as the pointing gesture, and data as to a direction of hand can be obtained from data glove. The pointing gestures are recognized based on whether or not they match up to the templates. In addition, it is assumed that the referent can be fixed alone before correlation is made (FIG. 5). Details of the correlation between the demonstrative word and the object have not been recited.

Furthermore, there has also been disclosed a literature, i.e., Thorisson, K. R., Koons, D. B., Bolt, R. A., "Multimodal Natural Dialogue", CHI' 92, 1992, pp.653–654. In the method set forth in this literature, details of the correlation between the demonstrative word and the object have not been given.

SUMMARY OF THE INVENTION

The present invention has been made in light of the above circumstances and it is an object of the present invention to provide a multimodal information inputting method capable of achieving effective information input by correlating an object pointed out by user's pointing gesture with a demonstrative word included in user's voice input in parallel to the pointing gesture to thus avoid reduction in efficiency because of mode switching, use of different buttons and simultaneous use of special key and an apparatus for embodying the same.

In order to achieve the above object, according to an aspect of the present invention, there is provided a multimodal information inputting method comprising the step of: generating a command for an application program based on both a movement of a cursor on a display means in compliance with operation of a pointing device and a voice produced in parallel to the operation when the pointing device is operated to select an object being displayed on the display means which is connected to a computer.

According to this aspect of the present invention, since the referent can be pointed without click operation of the mouse, there is caused no ambiguity between pointing operation for the question and the command and direct operation. Therefore, mode switching, use of different buttons, and simultaneous use of special key between the mode for executing the question and the command followed by pointing operation and the direct operation mode using the mouse can be neglected, and information can thus be input effectively and with less error.

In the preferred embodiment of the present invention, the object is selected as a referent candidate for the voice containing a demonstrative word if a moving speed of the cursor in a region of the object has a local minimum value.

In the preferred embodiment of the present invention, the object is selected as the referent candidate for the voice containing the demonstrative word if the local minimum value is less than a predetermined speed.

In the preferred embodiment of the present invention, such a certain referent candidate is recognized as a referent for the voice that a time period during when the cursor moves in the region is overlapped at maximum with a time period during when the voice is produced if a plurality of referent candidates each having the local minimum value less than the predetermined speed are present for the voice containing the demonstrative word.

In the preferred embodiment of the present invention, information associated with the voice produced are stored in a queue in sequence and information associated with the object as the referent candidate are also stored in the queue in sequence, and the information associated with the voice is collated with the information associated with the voice containing the demonstrative word from the head of the queue to recognize the object serving as the referent.

In the preferred embodiment of the present invention, the information associated with the voice produced is composed of a language as the result of language recognition, the number of object indicated by the language, a starting time of voiced sound area, and an ending time of voiced sound area.

In the preferred embodiment of the present invention, the information associated with the object as the referent candidate is composed of a referent candidate, a region entering time of referent candidate, and a region leaving time of the referent candidate.

In the preferred embodiment of the present invention, a merged result is derived by correlating information associated with the voice produced with information associated with the object recognized as a referent which can be correlated with the voice.

In the preferred embodiment of the present invention, the merged result is stored in a stack unless a language associated with a command is included in the merged results, and a command for an application program is generated by means of concerned merged result as well as one or more merged results stored in the stack if the language associated with the command is included in the merged result.

In order to achieve the above object, according to another aspect of the present invention, there is provided a multimodal information inputting apparatus comprising:

display means; object-voice correspondence acquiring means for recognizing a pointed object based on both a movement of a cursor on the display means depending upon operation of the pointing device and a voice produced in parallel to the operation when a pointing device is operated to select objects being displayed on the display means; and command generating means for generating a command for an application program based on correspondence information between the object and the voice obtained by the object-voice correspondence acquiring means.

In the preferred embodiment of the present invention, the object-voice correspondence acquiring means comprises, spoken language recognizing means for recognizing a language included in the voice based on information associated with the voice produced, and recognizing a starting time and an ending time of the language; referent recognizing means for recognizing objects as referent candidates for the voice containing a demonstrative word based on information associated with operation of the pointing device; and merging means for retrieving an object corresponding to the voice containing the demonstrative word from the referent candidates, and merging information associated with the object with information associated with the voice corresponding to the object.

In the preferred embodiment of the present invention, the referent recognizing means selects the object as the referent candidate for the voice containing the demonstrative word if a moving speed of a cursor in a region of the object has a local minimum value.

In the preferred embodiment of the present invention, the referent recognizing means selects the object as the referent candidate for the voice containing the demonstrative word if the local minimum value is less than a predetermined speed.

In the preferred embodiment of the present invention, the merging means recognizes such a certain referent candidate as a referent for the voice that a time period during when the cursor moves in the region is overlapped at maximum with a time period during when the voice is produced if a plurality of referent candidates each having the local minimum value less than the predetermined speed are present for the voice containing the demonstrative word.

In the preferred embodiment of the present invention, the command generating means stores the merged result in a stack unless a language associated with command is included in the merged result derived from the merging means, and generates a command for the application program by means of concerned merged result as well as one or more merged results stored in the stack if the language associated with the command is included in the merged result.

The preferred embodiment of the present invention further comprises a command translation database for storing a plurality of sets of languages and command formats to be retrieved by the command generating means when the command generating means generates the command.

The preferred embodiment of the present invention further comprises a demonstrative word dictionary database for storing a plurality of sets of demonstrative words and number of objects indicated by the demonstrative word to be retrieved by the spoken language recognizing means when the voice includes the demonstrative word.

The nature, principle and utility of the invention will become more apparent from the following detailed description when read in conjunction with the accompanying drawings.

DESCRIPTION OF THE PREFERRED EMBODIMENTS

Preferred embodiments of the present invention will be explained in detail with reference to accompanying drawings hereinafter.

Figure 1:
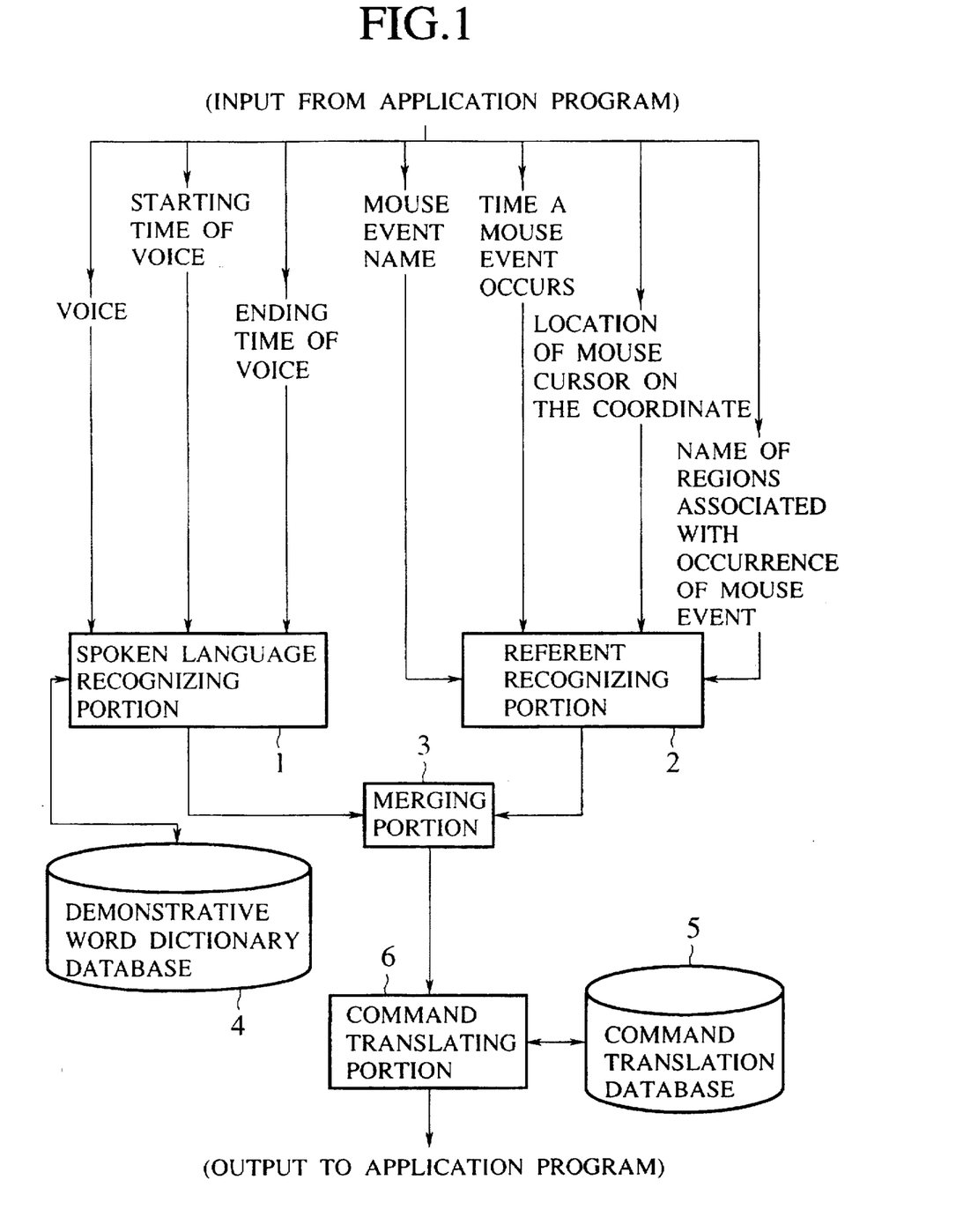
FIG. 1 is a block diagram showing a configuration of a multimodal information inputting apparatus according to an embodiment of the present invention.

FIG. 1 is a block diagram showing a configuration of a multimodal information inputting apparatus according to an embodiment of the present invention. The present apparatus comprises a spoken language recognizing portion 1, a referent recognizing portion 2, a merging portion 3, a demonstrative word dictionary database 4, a command translation database 5, and a command translating portion 6.

Figure 2:
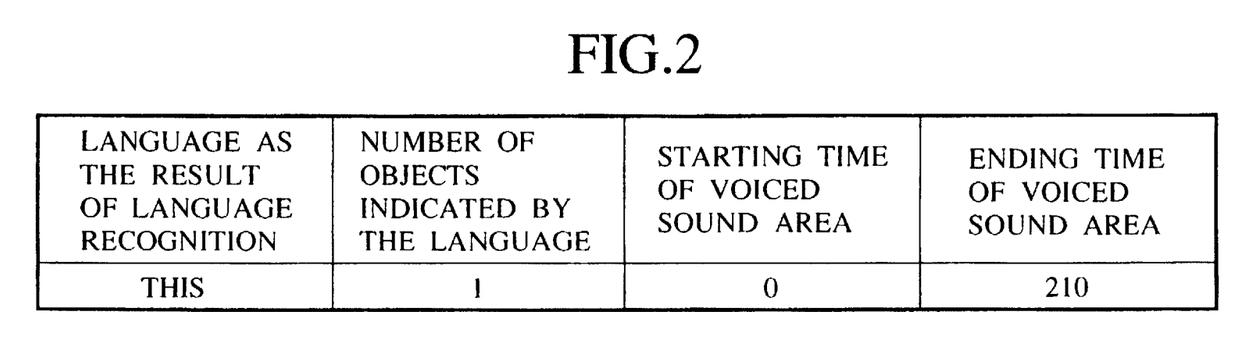
FIG. 2 is a view illustrating an example of field format for x together with the x.

The spoken language recognizing portion 1 may first acquire a voice and a starting time and an ending time of the voice from an application program as input information, and then classify voice data into a voice existing area (voiced sound area) and a voice non-existing area (unvoiced sound area). Subsequently, the spoken language recognizing portion 1 may execute language recognition process to recognize what language is meant by the voiced sound area. Referring to the demonstrative word dictionary database 4 which will be described later, the spoken language recognizing portion 1 may then output a set of a language as the result of language recognition process, the number of object indicated by the language, and the starting time and ending time of the voiced sound area. This set is represented as "x" for later detailed explanation. A field format for x is illustrated in FIG. 2 together with an example of the x. As shown in FIG. 2, the fields of x are composed of the language as the result of language recognition, the number of object indicated by the language, the starting time of the voiced sound area, and the ending time of the voiced sound area.

Figure 3:
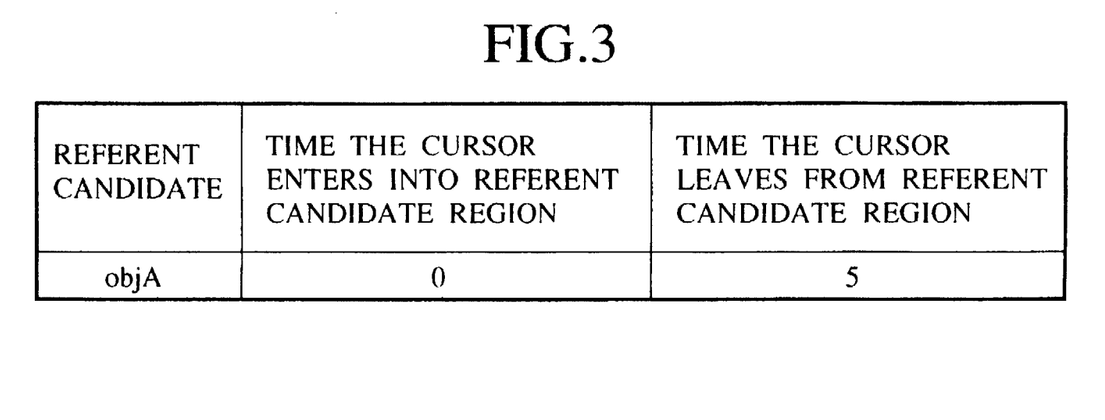
FIG. 3 is a view illustrating an example of field format for y together with the y.

The referent recognizing portion 2 may first acquire mouse event name, time when a mouse event occurs, location of a mouse cursor on the coordinate, and name of regions associated with occurrence of the mouse event from the application program as input information. The referent recognizing portion 2 may then detect reduction in a moving speed of the mouse cursor during a time period when the cursor stays or reside in the region which is capable of serving as a referent. The referent recognizing portion 2 may then output a set of name of staying region, time when the mouse cursor enters into the region (i.e., region entering time) and time when the mouse cursor leaves from the region (i.e., region leaving time) when the moving speed of the mouse cursor is reduced less than a certain value. This set is represented as "y" for later detailed explanation. A field format for y is illustrated in FIG. 3 together with an example of the y. As shown in FIG. 3, the fields of y consist of the referent candidate, the region entering time for the referent candidate, and the region leaving time for the referent candidate.

Figure 4:
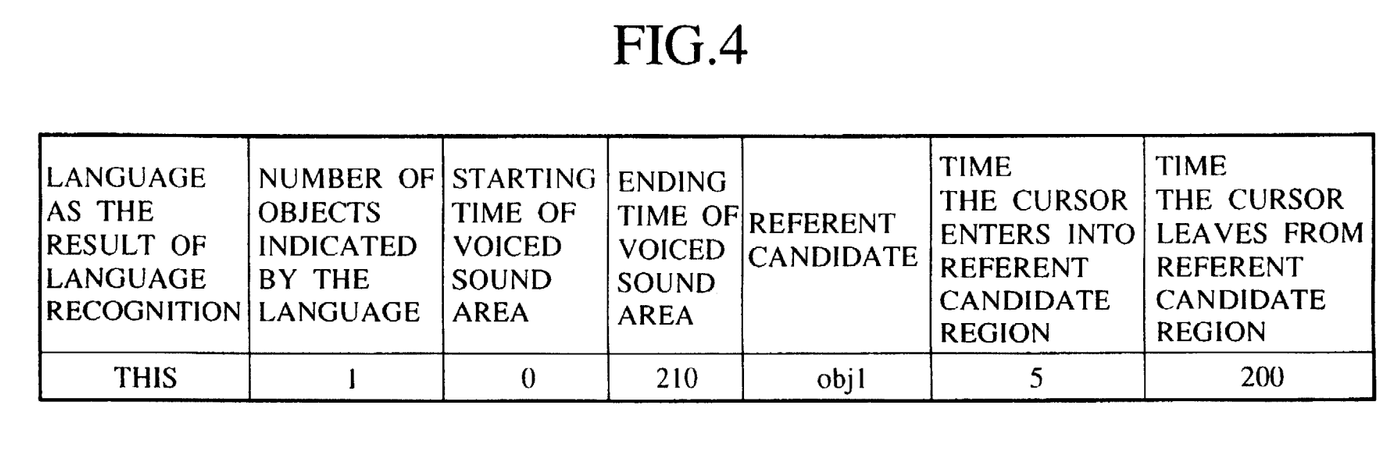
FIG. 4 is a view illustrating an example of field format for merged result z together with the z.

The merging portion 3 may correlate x which is the result output from the spoken language recognizing portion 1 with which is the result output from the referent recognizing portion 2. In the event that the language in the first field of x is the demonstrative word, each x is correlated with a certain y of respective y's which have time overlap between a time period from the starting time of x to the ending time of x and a time period from the region entering time of y to the region leaving time of y so as to have a maximum time overlap. A field format for the merged result z is illustrated in FIG. 4 together with an example of the z. As shown in FIG. 4, the fields of z are made up of the language as the result of language recognition, the number of object indicated by the language, the starting time of voiced sound area, the ending time of voiced sound area, the referent candidate, the time when the cursor enters into a referent candidate region (region entering time), and the time when the cursor leaves from referent candidate region (region leaving time).

Figure 5:
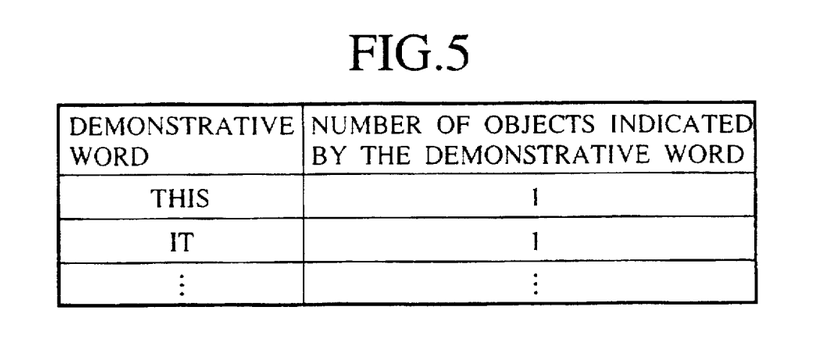
FIG. 5 is a view illustrating field format for demonstrative word dictionary.

The demonstrative word dictionary database 4 may record demonstrative words and the number of objects indicated by the demonstrative words. A field format for the demonstrative word dictionary database 4 is shown in FIG. 5.

Figure 6:
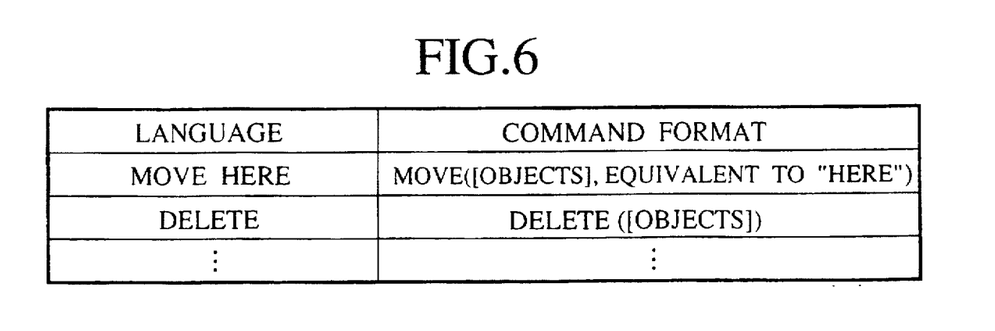
FIG. 6 is a view illustrating field format for command translation database.

The command translation database 5 may record or store languages and command formats corresponding to the languages. A field format for the command translation database 5 is illustrated in FIG. 6. In FIG. 6, items bracketed by [] means that such items can appear in plural times in the command format column.

The command translating portion 6 may retrieve the command translation database 5 using the language in the first field of the results z output from the merging portion 3 as a key. If the retrieved content does not match up to the key, the command translating portion 6 may store the z in a stack. On the other hand, if the retrieved content matches up to the key, the command translating portion 6 may read the command format from the command translation database 5 and then translate the retrieved content into the command which being serviceable in the application program, with the use of entire contents in the stack and the command format.

Explanation will then be made in brief of operations of the multimodal information inputting apparatus of the present invention.

Figure 7:
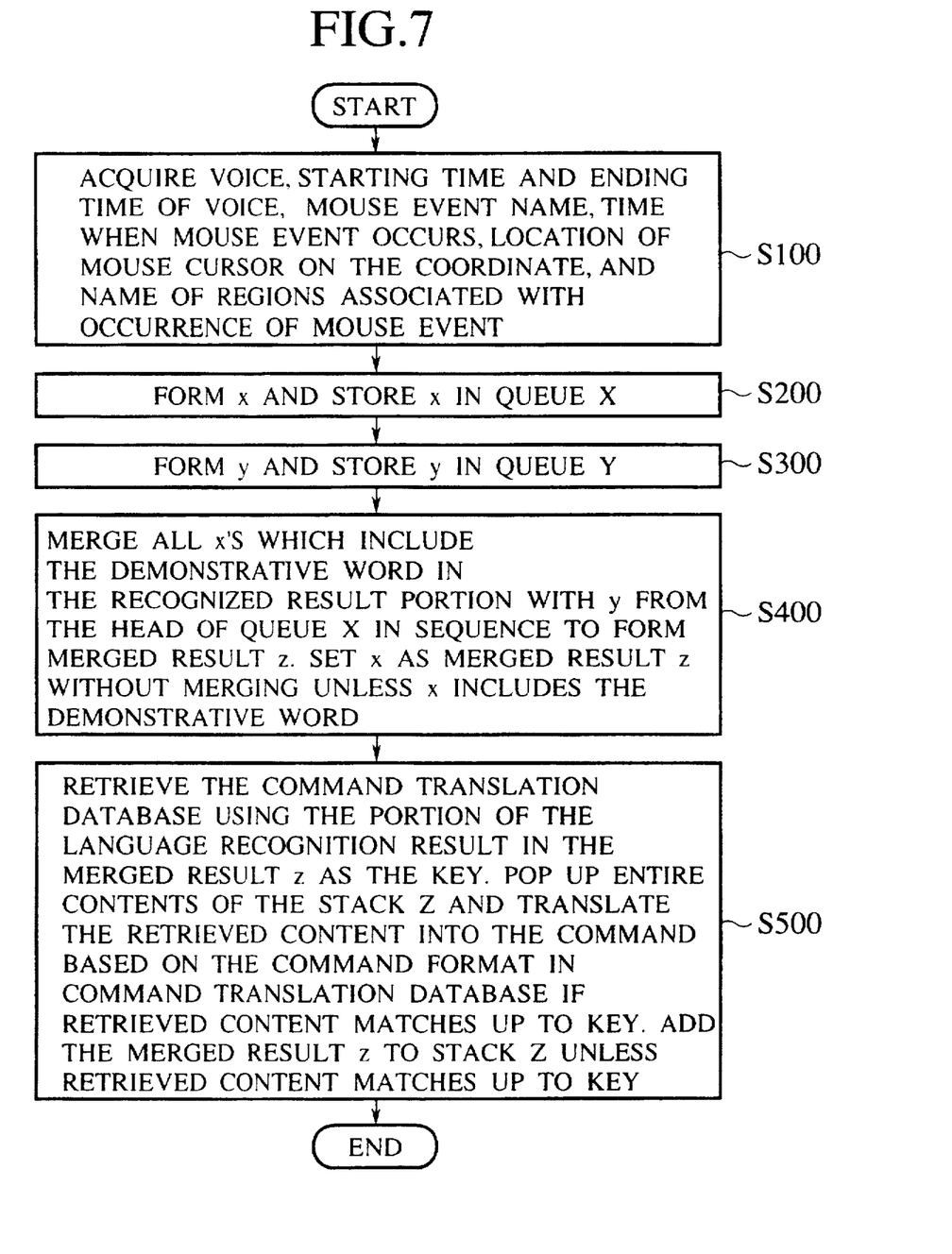
FIG. 7 is a flowchart illustrative of process procedures in the multimodal information inputting apparatus of the present invention.

FIG. 7 is a flowchart illustrative of process procedures in the multimodal information inputting method of the present invention. In the following explanation, it is assumed that the results obtained by respective portions are stored in the queues X and Y and a stack Z respectively.

The multimodal information inputting apparatus may acquire the voice, the starting time and ending time of the voice, the mouse event name, the time when a mouse event occurs, the location of the mouse cursor on the coordinate, and the name of regions associated with occurrence of the mouse event from the application program as input information (step 100).

The spoken language recognizing portion 1 may process the voice, and the starting time and ending time of the voice to thus form x. The x is then stored in the "queue X" (step 200).

The referent recognizing portion 2 may process the mouse event name, the time when a mouse event occurs, the location of the mouse cursor on the coordinate, and the name of regions associated with occurrence of the mouse event to thus form y. The y is then stored in the "queue Y" (step 300).

The merging portion 3 may merge all x's, in which the recognition result portion includes the demonstrative word, with y from the head of the "queue X" in sequence to thus form the merged result z, and then output the result z (step 400). Unless the x includes the demonstrative word in the recognition result portion, it is not subjected to merging process and then set to the merged result z.

The command translating portion 6 may retrieve the command translation database 5 using the portion of the language recognition result in the merged result z as the key. Unless the retrieved content matches up to the key, the command translating portion 6 may store the merged result z in the stack Z. In other words, the merged result z is added to the stack Z as it is. Conversely if the retrieved content matches up to the key, the command translating portion 6 may translate the retrieved content into the command with the use of entire contents of the stack Z and the command format stored in the command translation database 5. In other words, the entire contents of the stack Z are popped up and the retrieved content is then translated into the command in compliance with the command format stored in the command translation database 5 (step 500).

Figure 8:
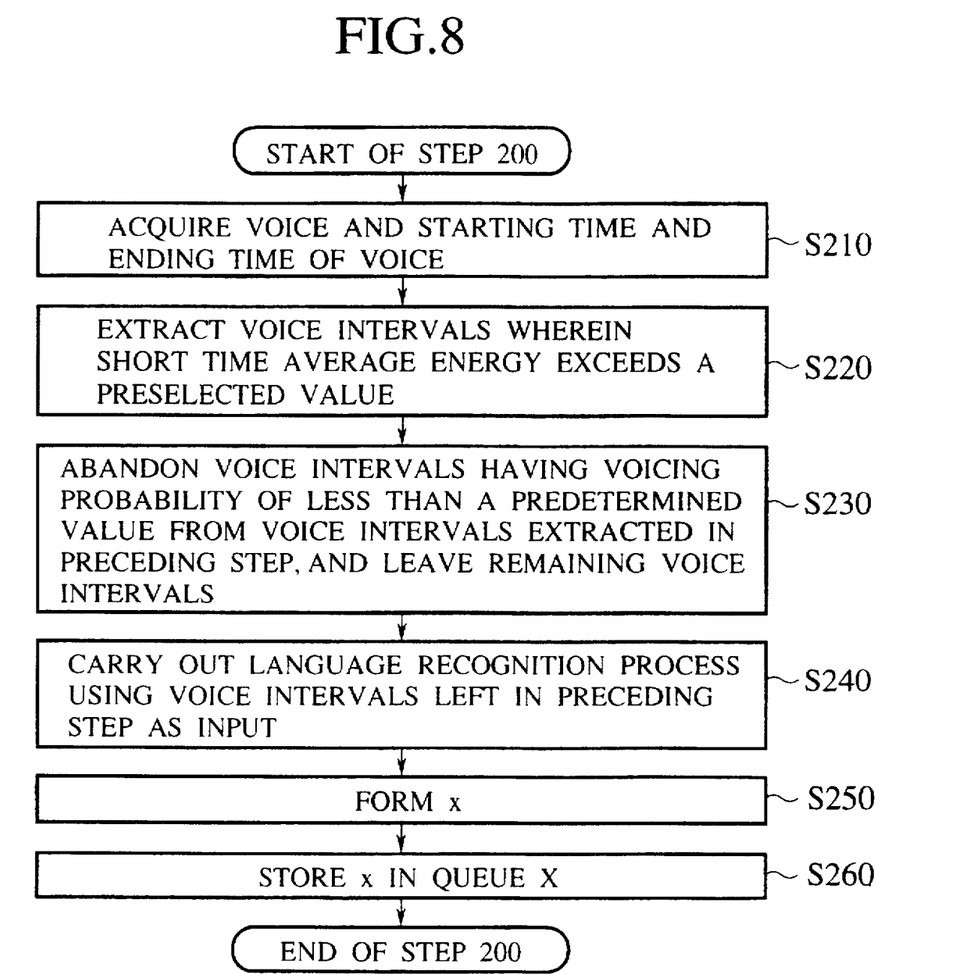
FIG. 8 is a flowchart illustrative of detailed process procedures in the spoken language recognizing portion in FIG. 1.

Next, explanation will be made in detail of process in the spoken language recognizing portion 1 in above step 200 in FIG. 7. FIG. 8 is a flowchart illustrative of detailed process procedures (step 200) in the spoken language recognizing portion 1.

The spoken language recognizing portion 1 may first acquire the voice and the starting time and ending time of the voice (step 210).

The spoken language recognizing portion 1 may then calculate short time average energy of speech sound wave based on amplitude of the voice, and then extract voice intervals wherein the short time average energy exceeds a preselected value (step 220).

For the voice intervals extracted in step 220, the voicing probability is then calculated. Only such voice intervals are then left that have the voicing probability exceeding more than a predetermined value (step 230).

With the use of the voice in the voice interval left in step 230 as input, language recognition process is effected to recognize what language is meant by the voice (step 240).

Next, the recognition result x is formed which comprises the language, the number of object indicated by the language, the starting time of the voice corresponding to the language, and the ending time of the voice (step 250).

The x is then stored in the "queue X" (step 260).

Figure 9:
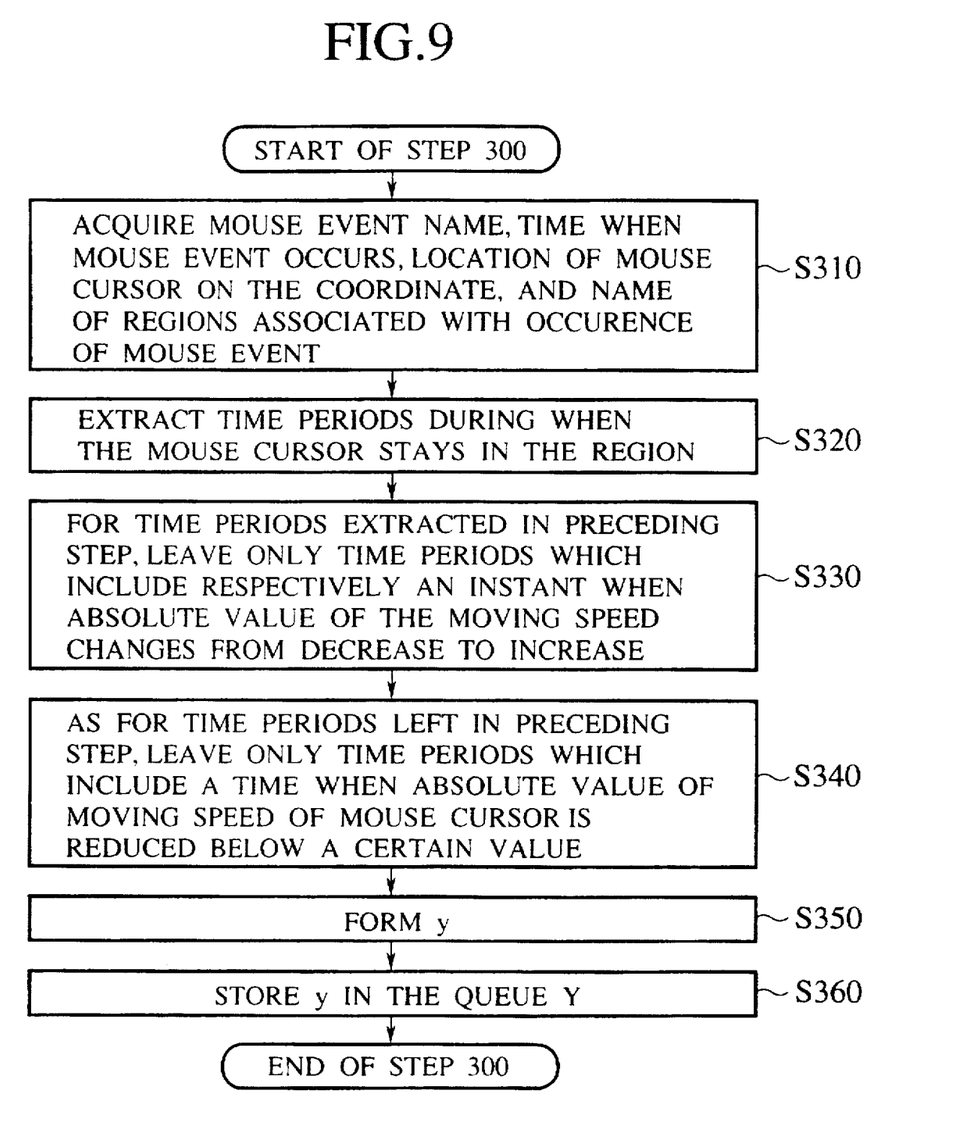
FIG. 9 is a flowchart illustrative of detailed process procedures in the referent recognizing portion in FIG. 1.

Explanation will then be made in detail of process in the referent recognizing portion 2 in above step 300 in FIG. 7. FIG. 9 is a flowchart illustrative of detailed process procedures (step 300) in the referent recognizing portion 2.

In the following explanation, it is assumed that the mouse event which occurs when the mouse cursor enters into the region of the object is termed as "Enter" while the mouse event which occurs when the mouse cursor leaves from the region of the object is termed as "Leave".

The referent recognizing portion 2 may first acquire the mouse event name, the time when the mouse event occurs, the location of the mouse cursor on the coordinate, and the name of regions associated with occurrence of the mouse event (step 310).

In turn, with the use of "Enter" and "Leave" of the mouse event acquired in step 310 and these acquired times, time periods during when the mouse cursor stays in the region are extracted (step 320).

For the time periods extracted in step 320, an average moving speed of the mouse cursor is detected based on locations and times of the mouse cursor on the coordinate. Only the time periods are then left which include respectively an instant when absolute value of the moving speed changes from decrease to increase, i.e., include respective local minimum values (step 330).

As for the time periods left in step 330, only the time periods are then left which include a time when the absolute value of the moving speed of the mouse cursor is reduced below a certain value (step 340).

Then y is formed which consists of the name of regions associated with occurrence of the mouse event, the region entering time and the region leaving time (step 350).

The y is then stored in the "queue Y" (step 360).

Figure 10:
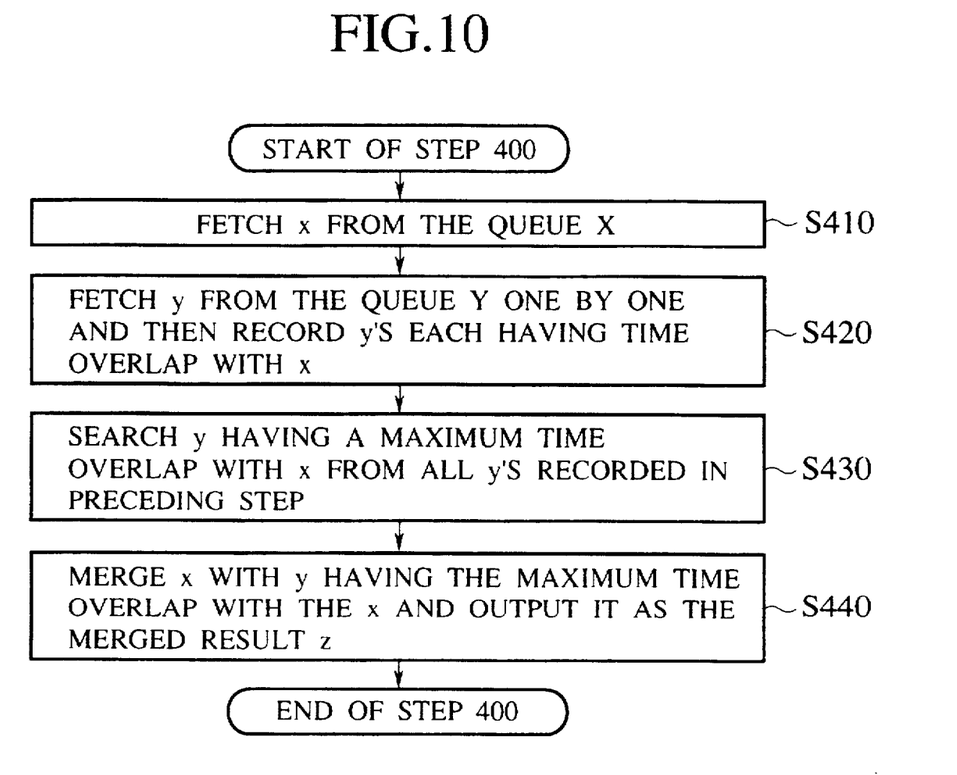
FIG. 10 is a flowchart illustrative of detailed process procedures in the merging portion in FIG. 1.

Explanation will then be made in detail of process in the merging portion 3 in the above step 400 in FIG. 7. FIG. 10 is a flowchart illustrative of detailed process procedures step 400) in the merging portion 3.

The merging portion 3 may first fetch one x from the "queue X" (step 410).

In the next, the merging portion 3 may fetch y from the "queue Y" one by one, then calculate time overlap of y with x, and then record y's which have time overlap (step 420).

The merging portion 3 may then search y having a maximum time overlap with x from all y's recorded in preceding step (step 430).

The merging portion 3 may then merge x with y which has the maximum time overlap with the x, and output it as the merged result z (step 440).

Figure 11:
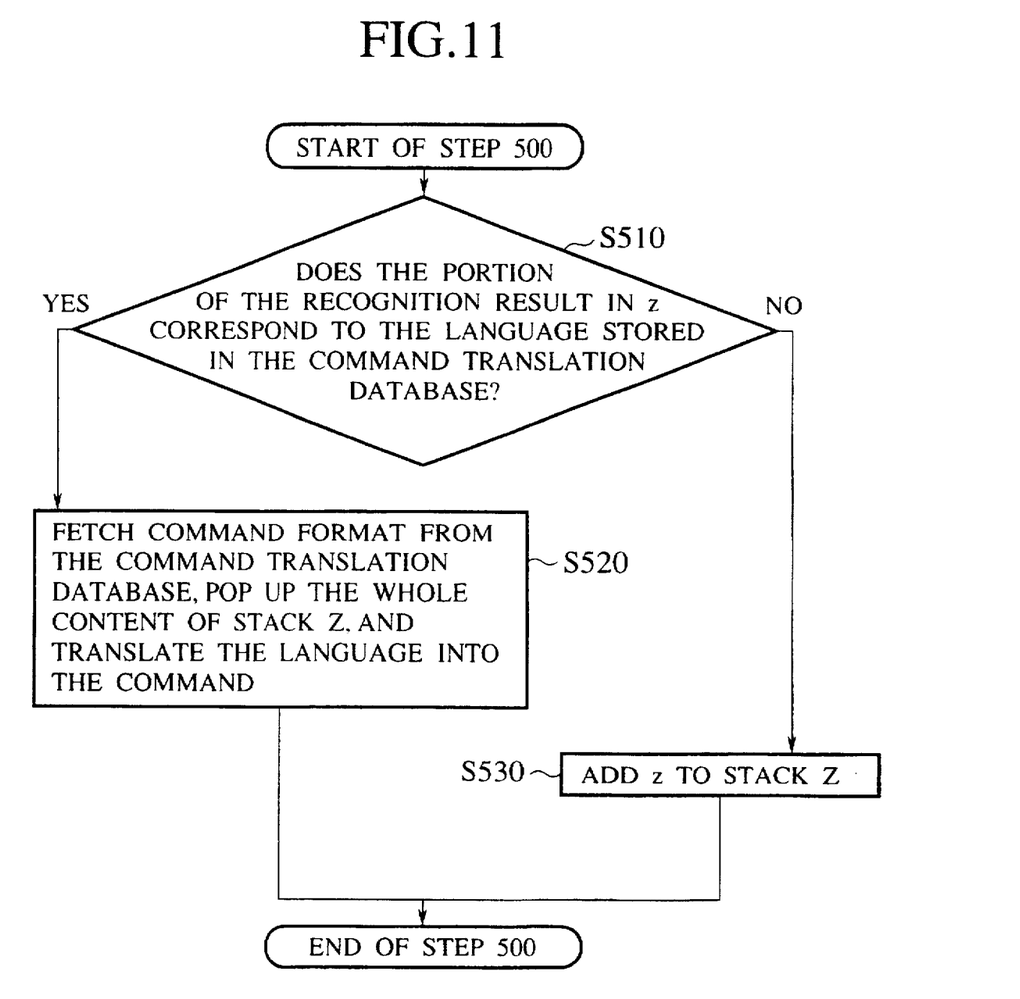
FIG. 11 is a flowchart illustrative of detailed process procedures in the command translating portion in FIG. 1.

Subsequently, explanation will be made in detail of process in the command translating portion 6 in the above step 500 in FIG. 7. FIG. 11 is a flowchart illustrative of detailed process procedures (step 500) in the command translating portion 6.

The command translating portion 6 may first decide whether or not the language as the result of language recognition included in z is the language which is stored in the command translation database 5. In other words, it is determined whether or not the portion of the recognition result included in z corresponds to the language stored in the command translation database 5 (step 510).

If affirmative decision is made in step 510, the command translating portion 6 may fetch command format from the command translation database 5, and then translate the language into the command based on the whole content of the stack Z. In other words, the command format is fetched from the command translation database 5, the whole content of stack Z are popped up, and the language is translated into the command based on the content (step 520).

On the contrary, if negative decision is made in step 510, the command translating portion 6 may add z to the stack Z (step 530).

The present invention will be explained with reference to a particular example hereinbelow.

Under assumptions that conventional spoken word recognizing apparatus is used to effect process in the spoken language recognizing portion 1, that languages used in the following example have already been registered in the spoken word recognizing apparatus, and that all languages can be recognized, explanation for the particular example will be made in the following. It is also assumed that the voice is produced sufficiently large and clear. In addition, it is assumed that, during the mouse cursor is pointing the object, the moving speed of the mouse cursor is sufficiently small rather than the case where the mouse cursor usually moves and is less than the certain value in step 340.

Figure 12:
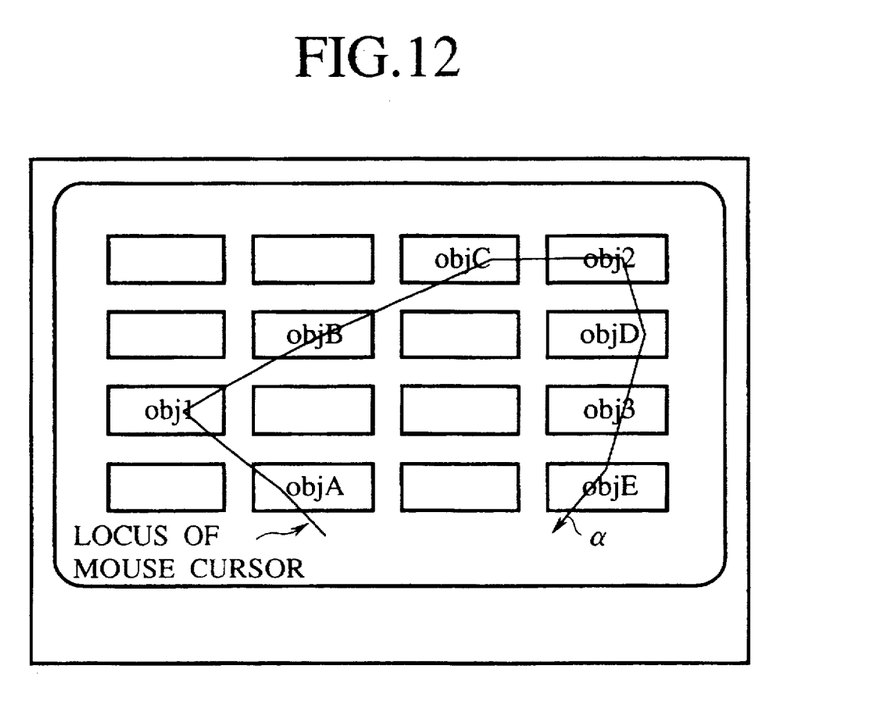
FIG. 12 is a diagrammatic representation of an input screen as a particular example and a movement of the mouse cursor on the input screen when the user operates the mouse.

FIG. 12 is a diagrammatic representation of an input screen in a particular example and a movement of the mouse cursor on the input screen when the user operates the mouse.

In FIG. 12, a line α a denotes a locus of the mouse cursor.

A case will be explained hereinbelow where information is input by the user who, while moving the mouse cursor shown in FIG. 12, produces his or her voice as follows.

1) The user moves the cursor to enter into the "obj1" region. At that time, the user renders the moving speed of the mouse slow in the first region and sounds like "this" simultaneously.

2) Subsequently, the user shifts the cursor to enter into the "obj2" region. The user also renders the moving speed of the mouse slow in the second region and sounds like "and this" at the same time.

3) Thereafter, the user shifts the cursor to enter into the "obj3" region. The user also renders the moving speed of the mouse slow in the third region and sounds like "move here" simultaneously. The user moves the cursor to leave from the third region.

Figure 13:
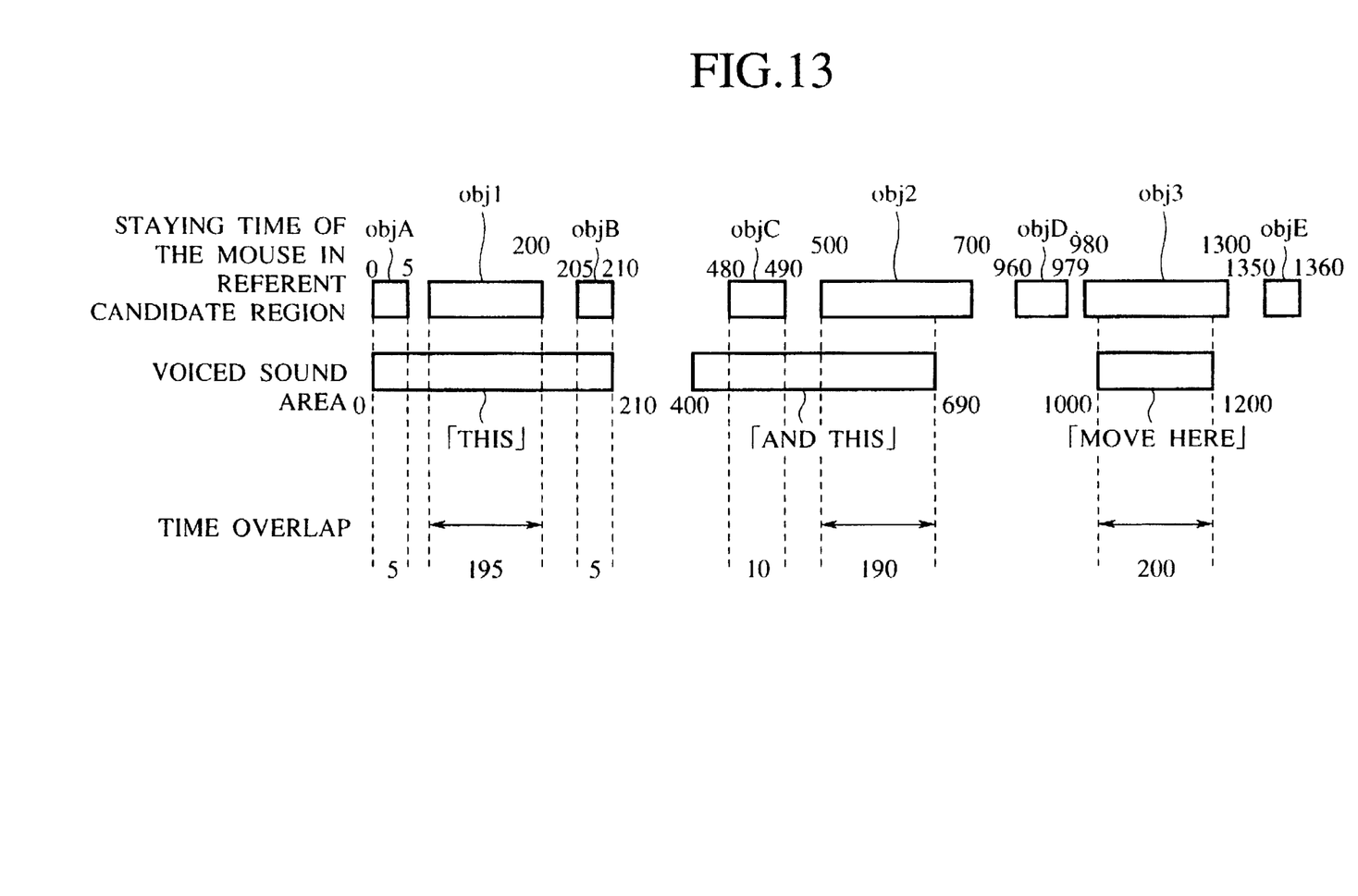
FIG. 13 is a view explaining a relationship between the movement of the mouse and the voice in the particular example.

Now, a particular example will be explained hereinbelow in which relationships shown in FIG. 13 are established between time periods from starting the voice to ending the voice and time periods during when the mouse cursor passes through referent regions. It is assumed that the moving speed of the cursor takes local minimum values respectively when the cursor passes through the objA, obj1, objB, objC, obj2, objD, obj3, and objE regions and that the absolute value of the moving speed is less than the certain value in step 340.

(a) According to the process in step 100, are acquired starting time of "this", ending time of "move here", and voice data produced between this starting time and this ending time, "Enter" into the objA region and "Leave" therefrom, times of them, and locations of the mouse cursor therebetween on the coordinate, "Enter" into the obj1region and "Leave" therefrom, times of them, and locations of the mouse cursor therebetween on the coordinate, "Enter" into the objB region and "Leave" therefrom, times of them, and locations of the mouse cursor therebetween on the coordinate, "Enter" into the objC region and "Leave" therefrom, times of them, and locations of the mouse cursor therebetween on the coordinate, "Enter" into the obj2region and "Leave" therefrom, times of them, and locations of the mouse cursor therebetween on the coordinate, "Enter" into the objD region and "Leave" therefrom, times of them, and locations of the mouse cursor therebetween on the coordinate, "Enter" into the obj3region and "Leave" therefrom, times of them, and locations of the mouse cursor therebetween on the coordinate, and "Enter" into the objE region and "Leave" therefrom, times of them, and locations of the mouse cursor therebetween on the coordinate.

(b) As the result of process in step 200, ("this", 1, 0, 210)

("and this", 1, 400, 690) and ("move here", 1, 1000, 1200) are entered into the "queue X" as x.

(c) As the result of process in step 300, (objA, 0, 5)

(obj1, 5, 200)

(objB, 205, 210)

(objC, 480, 490)

(obj2, 500, 700)

(objD, 960, 979)

(obj3, 980, 1300) and (objE, 1350, 1360)

are entered into the "queue Y" as y.

(d) In the process in step 400, since ("this", 1, 0, 210) stored in the "queue X" has time overlaps of 5, 195, 5, 0, 0, ... with respective y's stored in the "queue Y", the second (obj1, 5, 200) is correlated with ("this", 1, 0, 210). For this reason, ("this", 1, 0, 210, obj1, 5, 200) is output as the merged result z.

Since ("and this", 1, 400, 690) stored in the "queue X" has time overlaps of 0, 0, 0, 10, 190, 0, 0, ... with respective y's stored in the "queue Y", the fifth (obj2, 500, 700) is correlated with ("and this", 1, 400, 690). Hence, ("and this", 1, 400, 690, obj2, 500, 700) is output as the merged result z.

Since ("move here", 1, 1000, 1200) stored in the "queue X" has time overlap of . . . . . 0,200, 0 with respective y's stored in the "queue Y", the seventh (obj3, 980, 1300) is correlated with ("move here", 1, 1000, 1200). Therefore, ("move here", 1, 1000, 1200, obj3, 980, 1300)

is output as the merged result z.

(e) In the above (d), ("this", 1, 0, 210, obj1, 5, 200)

("and this", 1, 400, 690, obj2, 500, 700) and ("move here", 1, 1000, 1200, obj3, 980, 1300) are output in sequence from the merging portion 3 as z's. However, the command translating portion 6 determines that the first and second z's do not coincide with the items in the command translation database 5 shown in FIG. 6 and therefore stores them into the "stack Z". On the contrary, since the third z coincides with the items in the command translation database 5 shown in FIG. 6, the command translating portion 6 may write the format, pops up the content of the "stack Z" totally, and translate it into the command "move (obj1, obj2, obj3)".

(Note that "this" —"and this" –"move here" is a word string acquired by translating, with keeping word order, the Japanese sentence which means "move this and this here" in English.)

As stated foregoing, because the moving speed of the mouse cursor is slowed down in the referent regions on the display screen, the referent recognizing portion 2 may recognize icons as the referent candidate and the spoken language recognizing portion 1 may also recognize the language in the voice. Based on the correlation between the time during when referent candidates are being pointed and the time period during which the language in the voice is being spoken, the merging portion 3 may determine the icon for the referent corresponding to the demonstrative word and then correlate with each other. If the language as the result of language recognition has already been registered in the command translation database 5, the command translating portion 6 may translate the language into the command based on the whole content of the stack. Accordingly, in case the operator designates a desired icon by the cursor together with the voice, the pointing operation is capable of executing without click if only the mouse cursor is moved so that the moving speed of the cursor is reduced slowly less than a certain constant speed.

With the above, since the referent can be pointed without click operation of the mouse, there is caused no ambiguity between pointing operation for the question and the command and direct operation. Therefore, mode switching, separate use of button, and simultaneous use of special key between the mode for executing the question and the command followed by pointing operation and the direct operation mode using the mouse can be neglected, and information can thus be input effectively and with less error.

It should be understood that many modifications and adaptations of the invention will become apparent to those skilled in the art and it is intended to encompass such obvious modifications and changes in the scope of the claims appended hereto.

What is claimed is:

1. A multimodal information inputting apparatus comprising:

display means;

object-voice correspondence acquiring means for recognizing a pointed object based on both a movement of a cursor on said display means depending upon operation of said pointing device and a voice produced in parallel to said operation when a pointing device is operated to select objects being displayed on said display means; and command generating means for generating a command for an application program based on correspondence information between said object and said voice obtained by said object-voice correspondence acquiring means, wherein said object-voice correspondence acquiring means includes, spoken language recognizing means for recognizing a language included in said voice based on voice information associated with said voice produced and recognizing a starting time and an ending time of said language;

reference recognizing means for recognizing objects as referent candidates for said voice containing a demonstrative word based on operation information associated with operation of said pointing device; and merging means for retrieving an object corresponding to said voice containing said demonstrative word from said referent candidates, and merging information associated with said object with information associated with said voice corresponding to said object, and wherein said referent recognizing means selects said object as said referent candidate for said voice containing said demonstrative word if a moving speed of a cursor in a region of said object has a local minimum value which is less than a predetermined speed.

2. A multimodal information inputting apparatus recited in claim 1, wherein said merging means recognizes such a certain referent candidate as a referent for said voice that a time period during when said cursor moves in said region is overlapped at maximum with a time period during when said voice is produced if a plurality of referent candidates each having said local minimum value less than said predetermined speed are present for said voice containing said demonstrative word.

3. A multimodal information inputting method comprising the step of:

generating a command for an application program based on both a movement of a cursor on a display means in compliance with operation of a pointing device and a voice produced in parallel to said operation when said pointing device is operated to select an object being displayed on said display means which is connected to a computer, wherein said object is selected as a referent candidate for said voice containing a demonstrative word if a moving speed of said cursor in a region of said object has a local minimum value and said local minimum value is being less than a predetermined speed.

4. A multimodal information inputting method recited in claim 3, wherein such a certain referent candidate is recognized as a referent for said voice that a time period during when said cursor moves in said region is overlapped at maximum with a time period during when said voice is produced if a plurality of referent candidates each having said local minimum value less than said predetermined speed are present for said voice containing said demonstrative word.

5. A multimodal information inputting method recited in claim 4, wherein information associated with said voice produced are stored in a queue in sequence and information associated with said object as said referent candidate are also stored in said queue in sequence, and said information associated with said voice is collated with said information associated with said voice containing said demonstrative word from the head of said queue to recognize said object serving as said referent.

6. A multimodal information inputting method recited in claim 5, wherein said information associated with said voice produced is composed of a language as the result of language recognition, the number of object indicated by said language, a starting time of voiced sound area, and an ending time of voiced sound area.

7. A multimodal information inputting method recited in claim 5, wherein said information associated with said object as said referent candidate is composed of a referent candidate, a region entering time of referent candidate, and a region leaving time of said referent candidate.

8. A multimodal information inputting method recited in claim 4, wherein a merged result is derived by correlating information associated with said voice produced with information associated with said object recognized as a referent which can be correlated with said voice.

9. A multimodal information inputting method recited in claim 8, wherein said merged result is stored in a stack unless a language associated with a command is included in said merged results, and a command for an application program is generated by means of concerned merged result as well as one or more merged results stored in said stack if said language associated with said command is included in said merged result.

* * * * *